United States Patent
Maehashi

(10) Patent No.: US 11,240,453 B2
(45) Date of Patent: Feb. 1, 2022

(54) PHOTOELECTRIC CONVERSION DEVICE

(71) Applicant: CANON KABUSHIKI KAISHA, Tokyo (JP)

(72) Inventor: Yu Maehashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/010,362

(22) Filed: Sep. 2, 2020

(65) Prior Publication Data

US 2021/0075989 A1 Mar. 11, 2021

(30) Foreign Application Priority Data

Sep. 9, 2019 (JP) .............................. JP2019-163864

(51) Int. Cl.
*H04N 5/3745* (2011.01)
*H04N 5/378* (2011.01)

(52) U.S. Cl.
CPC ......... *H04N 5/37455* (2013.01); *H04N 5/378* (2013.01)

(58) Field of Classification Search
CPC .......... G01J 2001/442; G01J 2001/446; H01L 31/107
See application file for complete search history.

(56) References Cited

U.S. PATENT DOCUMENTS

| | | | |
|---|---|---|---|
| 8,598,901 B2 | 12/2013 | Hiyama et al. ............. | 324/750.3 |
| 8,711,259 B2 | 4/2014 | Maehashi et al. ............ | 348/294 |
| 9,407,847 B2 | 8/2016 | Maehashi et al. . | H04N 5/37457 |
| 9,762,840 B2 | 9/2017 | Yamazaki et al. ............ | H04N 5/37457 |
| 9,986,194 B2 | 5/2018 | Maehashi ................ | H04N 5/66 |
| 2014/0231630 A1* | 8/2014 | Rae .......................... | G01S 7/497 250/214.1 |
| 2018/0108800 A1* | 4/2018 | Morimoto ......... | H01L 31/03529 |
| 2018/0308881 A1* | 10/2018 | Hynecek ................. | G01S 17/86 |
| 2019/0014281 A1 | 1/2019 | Kobayashi | |
| 2019/0222733 A1 | 7/2019 | Nishide et al. ......... | H01L 31/10 |
| 2019/0305030 A1 | 10/2019 | Maehashi et al. ............ | H01L 27/14643 |

FOREIGN PATENT DOCUMENTS

| | | | |
|---|---|---|---|
| JP | H07-067043 A | | 3/1995 |
| JP | 2006242716 A | * | 9/2006 |
| JP | 2018-201155 A | | 12/2018 |
| JP | 2019-17065 A | | 1/2019 |

* cited by examiner

*Primary Examiner* — Thanh Luu
(74) *Attorney, Agent, or Firm* — Venable LLP

(57) ABSTRACT

A photoelectric conversion device includes a plurality of pixels arranged in an array to form a plurality of rows and a plurality of columns. Each of the plurality of pixels includes a photon detection element that outputs an output signal generated by avalanche multiplication in accordance with incidence of a photon, a quench element connected to the photon detection element, a waveform shaper that is connected to the photon detection element and generates a detection signal based on the output signal, and a signal processing circuit that performs signal processing on the detection signal output from the waveform shaper. The signal processing circuit includes a counting unit that performs a counting process of counting the detection signal output from the waveform shaper, and a calculation unit that performs a predetermined calculation process on a count result output from the counting unit.

20 Claims, 10 Drawing Sheets

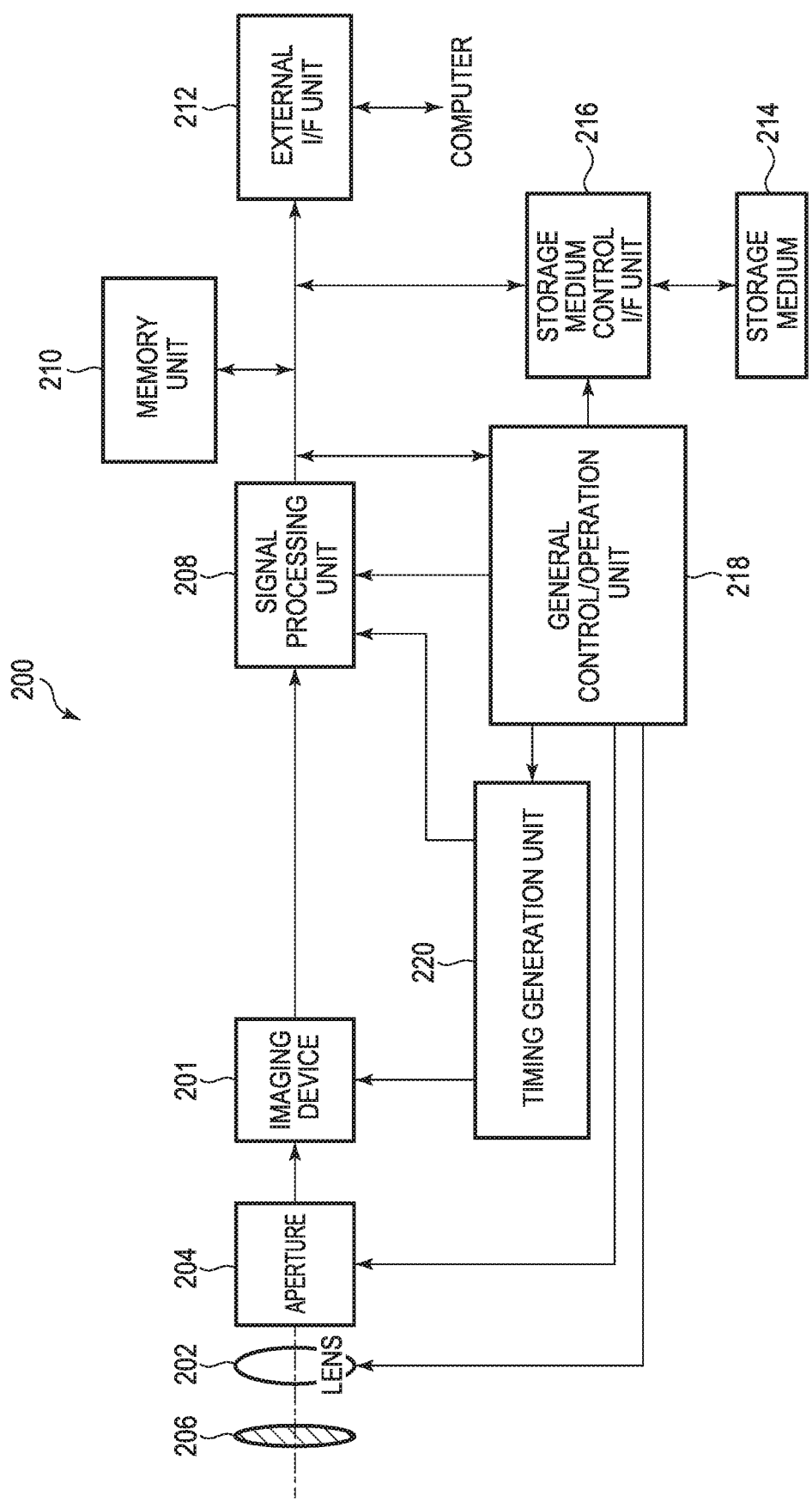

PHOTOELECTRIC CONVERSION DEVICE

BACKGROUND OF THE INVENTION

Field of the Invention

The present invention relates to a photoelectric conversion device.

Description of the Related Art

As photon detection elements, an avalanche photodiode (APD) or a single photon avalanche diode (SPAD) that multiplies charges generated by incidence of a photon with avalanche breakdown is known. These photon detection elements are utilized for image capturing or ranging as a photon count sensor that counts detected photons. In general, a pixel of a sensor using a SPAD is formed of a photon detection element, a quench element, a waveform shaper, and a signal processing circuit. The avalanche current occurring when the photon detection element detects a photon causes a voltage drop at the quench element, and a detection signal is generated. The detection signal is shaped into a pulsed waveform by the waveform shaper and input to the signal processing circuit. Japanese Patent Application Laid-Open No. H07-067043 discloses that the operation of the pixel is controlled by a control signal, thereby a count range is effectively expanded, and the dynamic range is expanded.

However, the function of the signal processing circuit disclosed in Japanese Patent Application Laid-Open No. H07-067043 is limited to counting of a detection signal as with the conventional photon count sensor.

SUMMARY OF THE INVENTION

The present invention intends to provide a photoelectric conversion device that can perform various calculation processes at a signal processing circuit.

According to one aspect of the present invention, provided is a photoelectric conversion device including a plurality of pixels arranged in an array to form a plurality of rows and a plurality of columns. Each of the plurality of pixels includes a photon detection element that outputs an output signal generated by avalanche multiplication in accordance with incidence of a photon, a quench element connected to the photon detection element, a waveform shaper that is connected to the photon detection element and generates a detection signal based on the output signal, and a signal processing circuit that performs signal processing on the detection signal output from the waveform shaper. The signal processing circuit includes a counting unit that performs a counting process of counting the detection signal output from the waveform shaper and a calculation unit that performs a predetermined calculation process on a count result output from the counting unit.

Further, according to another aspect of the present invention, provided is a photoelectric conversion device including a plurality of pixels arranged in an array to form a plurality of rows and a plurality of columns. Each of the plurality of pixels includes a photon detection element that outputs an output signal generated by avalanche multiplication in accordance with incidence of a photon, a quench element connected to the photon detection element, a waveform shaper that is connected to the photon detection element and generates a detection signal based on the output signal, and a signal processing circuit that performs signal processing on the detection signal output from the waveform shaper. The signal processing circuit includes a calculation unit that performs a predetermined calculation process on the detection signal output from the waveform shaper and a counting unit that performs a counting process on a calculation result output from the calculation unit.

Further features of the present invention will become apparent from the following description of exemplary embodiments with reference to the attached drawings.

BRIEF DESCRIPTION OF THE DRAWINGS

FIG. 14 is a block diagram illustrating a general configuration of an imaging system according to a fourth embodiment of the present invention.

DESCRIPTION OF THE EMBODIMENTS

First Embodiment

A photoelectric conversion device and a method of driving the same according to a first embodiment of the present invention will be described with reference to FIG. 1 to FIG. 7.

Figure 1:
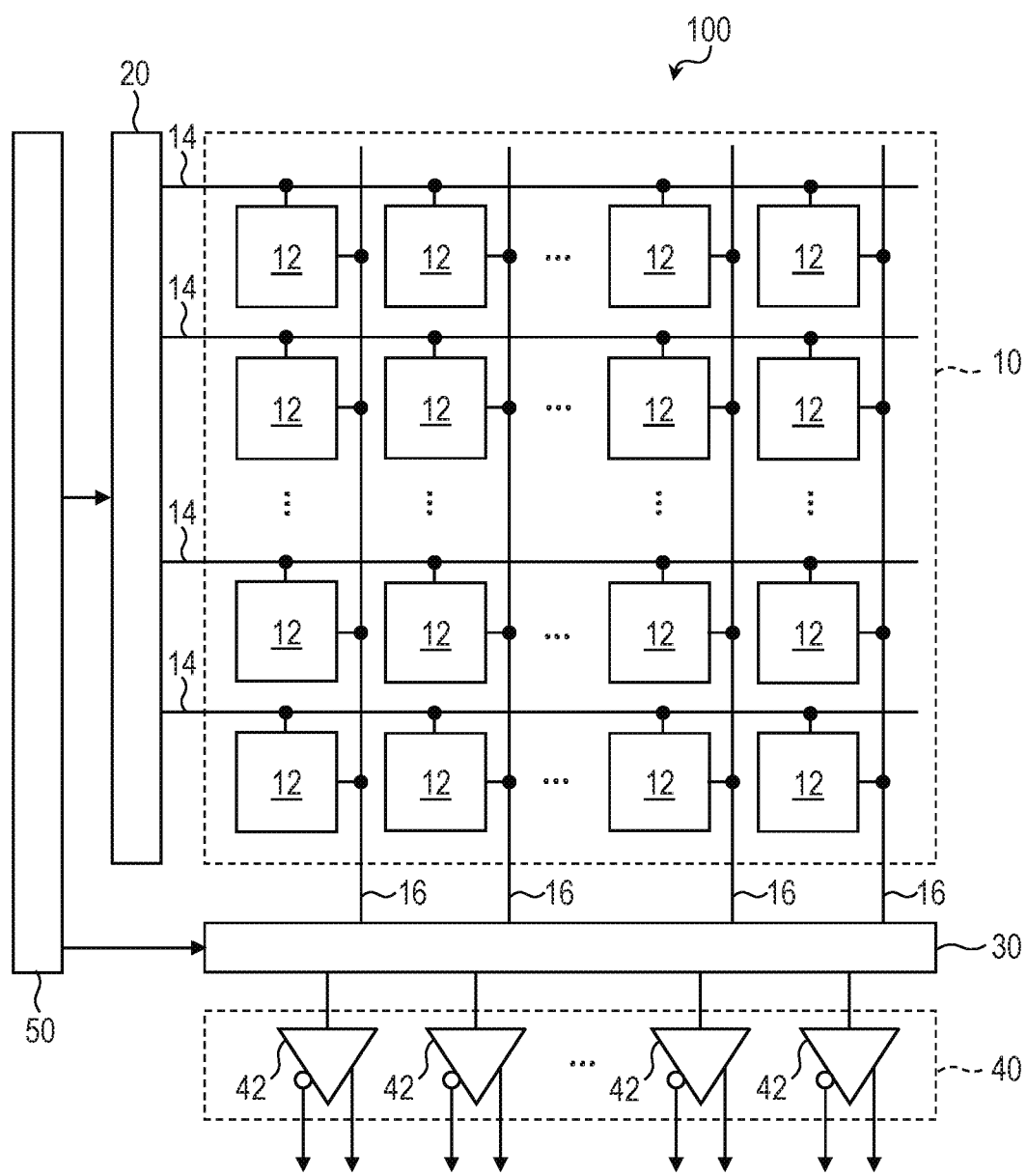
FIG. 1 is a block diagram illustrating a general configuration of a photoelectric conversion device according to a first embodiment of the present invention.
Figure 2:
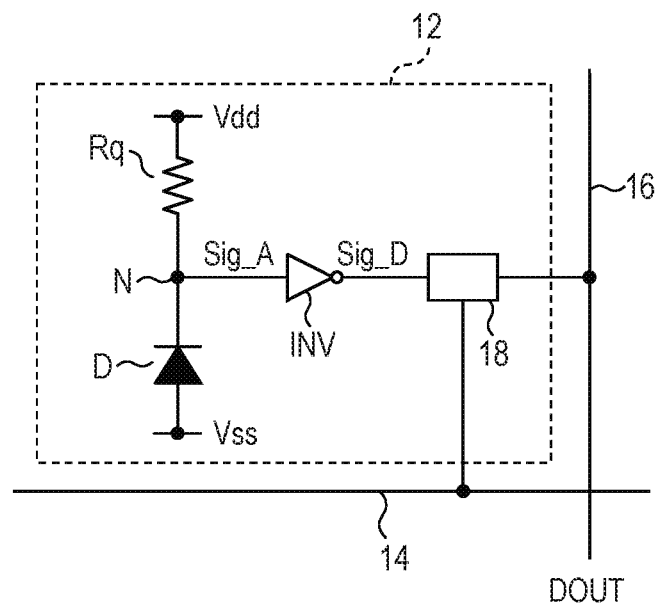
FIG. 2 is a circuit diagram illustrating a configuration example of a pixel of the photoelectric conversion device according to the first embodiment of the present invention.
Figure 3:
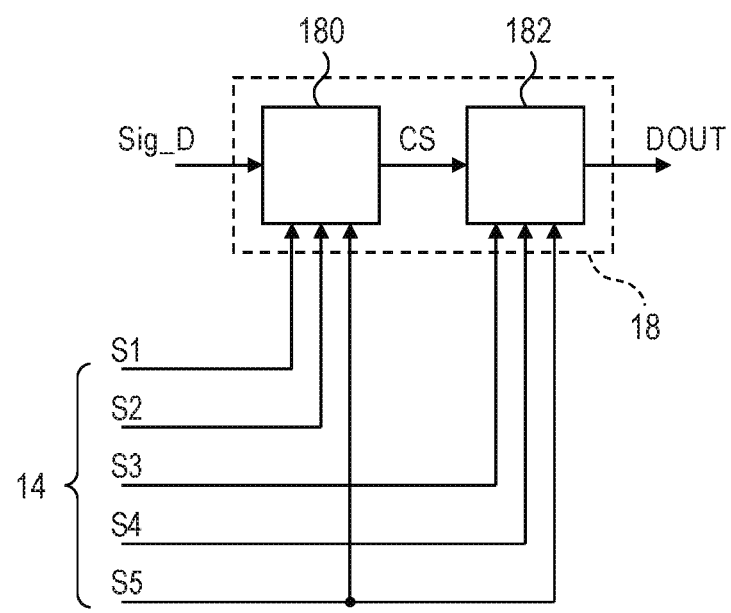
FIG. 3 is a block diagram illustrating a configuration example of a signal processing circuit of the photoelectric conversion device according to the first embodiment of the present invention.
Figure 4:
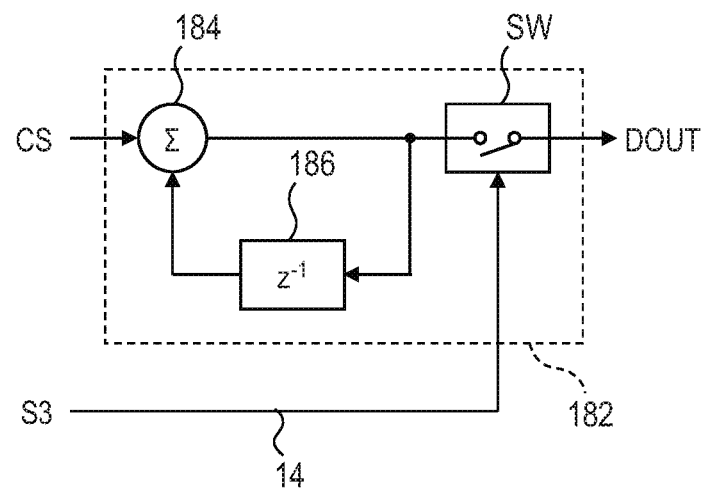
FIG. 4 and FIG. 5 are block diagrams illustrating configuration examples of a post-processing unit in the signal processing circuit of the photoelectric conversion device according to the first embodiment of the present invention.
Figure 5:
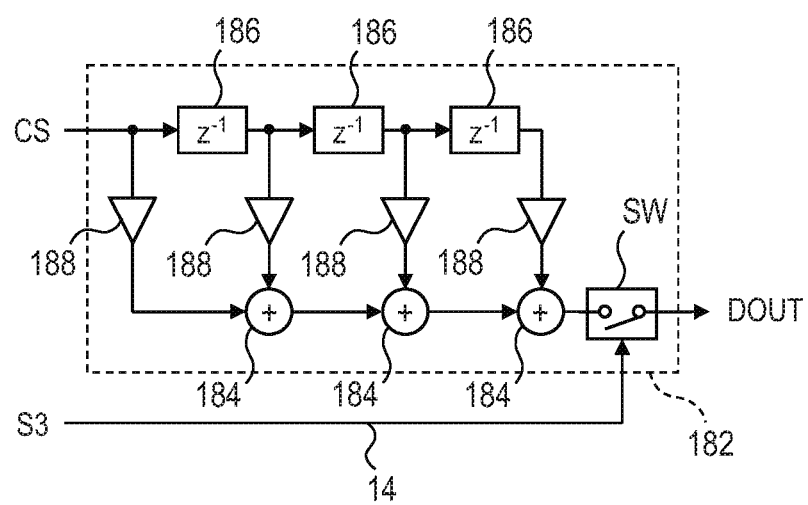

First, the configuration of the photoelectric conversion device according to the present embodiment will be described with reference to FIG. 1 to FIG. 5. FIG. 1 is a block diagram illustrating a general configuration of the photoelectric conversion device according to the present embodiment. FIG. 2 is a circuit diagram illustrating a configuration example of a pixel of the photoelectric conversion device according to the present embodiment. FIG. 3 is a block diagram illustrating a configuration example of a signal processing circuit of the photoelectric conversion device according to the present embodiment. FIG. 4 and FIG. 5 are block diagrams illustrating configuration examples of a post-processing unit in the signal processing circuit of the photoelectric conversion device according to the present embodiment.

As illustrated in FIG. 1, a photoelectric conversion device 100 according to the present embodiment includes a pixel region 10, a vertical scanning circuit 20, a horizontal scanning circuit 30, an output circuit 40, and a control circuit 50.

In the pixel region 10, a plurality of pixels 12 arranged in an array over a plurality of rows and a plurality of columns are provided. The number of pixels 12 forming the pixel region 10 is not particularly limited. For example, the pixel region 10 can be formed of several thousand rows by several thousand columns of the pixels 12 as with general digital cameras. Alternatively, the pixel region 10 may be formed of a plurality of pixels 12 arranged in one row or one column. Alternatively, the pixel region 10 may be formed of a single pixel 12.

On each row of the pixel array of the pixel region 10, a control line 14 is arranged extending in a first direction (the horizontal direction in FIG. 1). The control line 14 is connected to the pixels 12 arranged in the first direction, respectively, to form a signal line common to these pixels 12. The first direction in which the control line 14 extends may be denoted as a row direction or a horizontal direction. Each of the control lines 14 may include a plurality of signal lines used for supplying multiple types of control signals to the pixels 12.

Further, on each column of the pixel array of the pixel region 10, a data line 16 is arranged extending in a second direction (the vertical direction in FIG. 1) crossing the first direction. The data line 16 is connected to the pixels 12 arranged in the second direction, respectively, to form a signal line common to these pixels 12. The second direction in which the data line 16 extends may be denoted as a column direction or a vertical direction. Each of the data lines 16 may include a plurality of signal lines used for transferring digital signals output from the pixels 12 on a bit basis.

The control line 14 on each row is connected to the vertical scanning circuit 20. The vertical scanning circuit 20 is a circuit unit that supplies control signals used for driving the pixels 12 to the pixels 12 via the control line 14. The vertical scanning circuit 20 scans the pixels 12 in the pixel region 10 sequentially on a row basis to output a pixel signal of each pixel 12 to the horizontal scanning circuit 30 via the data lines 16.

The data line 16 on each column is connected to the horizontal scanning circuit 30. The horizontal scanning circuit 30 is a circuit unit that selects pixel signals of the pixel 12 on respective columns output from the pixel region 10 on a row basis and sequentially outputs the selected pixel signals to the output circuit 40. The horizontal scanning circuit 30 includes a plurality of holding portions corresponding to the plurality of columns of the pixel region 10 and holds pixel signals of the pixels 12 on respective columns output on a row basis from the pixel region 10 in the holding portion on the corresponding column. The horizontal scanning circuit 30 sequentially scans the holding portions on respective columns and sequentially outputs pixel signals held by respective holding portions to the output circuit 40.

The output circuit 40 is a circuit unit that includes a transmitter circuit 42 and outputs a pixel signal output from the horizontal scanning circuit 30 to the outside of the photoelectric conversion device 100. For example, the transmitter circuit 42 may be formed of a SERializer/DESerializer (SerDes) transmitter circuit such as a Low Voltage Differential Signaling (LVDS) circuit, a Scalable Low Voltage Signaling (SLVS) circuit, or the like. Note that an external interface circuit forming the output circuit 40 is not particularly limited.

The control circuit 50 is a circuit unit that supplies control signals used for controlling the operation or its timing of the vertical scanning circuit 20 and the horizontal scanning circuit 30. Note that at least some of control signals that controls the operation or its timing of the vertical scanning circuit 20 and the horizontal scanning circuit 30 may be supplied to the outside of the photoelectric conversion device 100.

As illustrated in FIG. 2, each of the pixels 12 includes a photon detection element D, a quench element Rq, a waveform shaper INV, and a signal processing circuit 18. The photon detection element D may be formed of a photodiode such as an avalanche photodiode (APD) or a single photon avalanche diode (SPAD) that multiplies charges generated by incidence of a photon with avalanche breakdown. The quench element Rq may be formed of a resistor element, a MOS transistor, or the like. The waveform shaper INV is a waveform shaper that converts an analog signal output from the photon detection element D into a detection signal and may be formed of an inverter circuit, for example. Note that the signal processing circuit 18 will be described later.

The anode of the photodiode forming the photon detection element D is connected to the node to which a voltage Vss is supplied. One terminal of the quench element Rq is connected to the cathode of the photodiode forming the photon detection element D. The other terminal of the quench element Rq is connected to the node to which the voltage Vdd is supplied. The input terminal of the waveform shaper INV is connected to the connection node (node N) between the photon detection element D and the quench element Rq. The output terminal of the waveform shaper INV is connected to the input terminal of the signal processing circuit 18. The output terminal of the signal processing circuit 18 is connected to the data line 16. Further, the control line 14 is connected to the signal processing circuit 18.

The voltage Vss and voltage Vdd are set so as to be able to apply, to the photon detection element D, a reverse bias voltage sufficient for operation in a Geiger mode. In an example, a negative high voltage is provided as the voltage Vss, and a positive voltage around a power supply voltage is supplied as the voltage Vdd. In the present embodiment, the photodiode forming the photon detection element D is operated in a Geiger mode, that is, used as a single photon avalanche diode (SPAD).

Thereby, the photon detection element D is in a state where a reverse bias voltage corresponding to a potential difference between the voltage Vdd and the voltage Vss is applied thereto. This reverse bias voltage is a higher voltage than the breakdown voltage of the photodiode forming the photon detection element D and is sufficient to cause avalanche multiplication (Geiger mode). However, since no carrier that is a seed exists in a state where no photon enters the photon detection element D, no avalanche multiplication occurs, and no current flows in the photon detection element D (standby state).

Once a photon enters the photon detection element D in a standby state, the incident photon causes excitation, and carriers are generated inside the photon detection element D. The carriers generated inside the photon detection element D are accelerated by a high electric field inside the photon detection element D and causes avalanche multiplication, and a large avalanche current occurs (Geiger mode operation). This avalanche current flows in the quench element Rq, thereby a voltage drop due to the quench element Rq occurs, and the voltage between terminals of the photon detection element D decreases. Thereby, the photon detection element D exits the Geiger mode (non-Geiger mode), and the avalanche multiplication stops. Carriers at the node (node N) on the cathode side of the photon detection element D are gradually discharged via the quench element Rq connected as a load. Thereby, the potential of the node N returns to the initial voltage.

With such a series of operations, in response to incidence of a photon, the node N enters a state where the voltage is reduced by a flow of a large current in the Geiger mode from the standby state and then returns to the standby mode. Such a potential change at the node N is input to the waveform shaper INV as a signal Sig_A. The waveform shaper INV shapes the waveform of the input signal Sig_A into a pulsed signal Sig_D and outputs the pulsed signal Sig_D to the signal processing circuit 18. This signal Sig_D is a detection signal. The signal processing circuit 18 performs predetermined signal processing on the signal Sig_D. The signal processing circuit 18 outputs a signal DOUT, which is a signal after signal processing, to the data line 16 in response to a control signal output from the vertical scanning circuit 20 via the control line 14.

As illustrated in FIG. 3, the signal processing circuit 18 includes a counting unit 180 and a post-processing unit 182. The input terminal of the counting unit 180 that is also the input terminal of the signal processing circuit 18 is connected to the output terminal of the waveform shaper INV. The output terminal of the counting unit 180 is connected to the input terminal of the post-processing unit 182. The output terminal of the post-processing unit 182 that is also the output terminal of the signal processing circuit 18 is connected to the data line 16.

The counting unit 180 and the post-processing unit 182 are connected to the control line 14. A control signal S1 used for controlling the output of a count result, a control signal S2 used for controlling a reset operation of the counting unit 180, and a control signal S5 used for switching enable/disable of operation are supplied to the counting unit 180 from the vertical scanning circuit 20 via the control line 14. A control signal S3 used for controlling the output of a process result, a control signal S4 used for controlling a reset operation of the post-processing unit 182, and the control signal S5 used for switching enable/disable of operation are supplied to the post-processing unit 182 from the vertical scanning circuit 20 via the control line 14.

The signal Sig_D output from the waveform shaper INV is input to the input terminal of the counting unit 180. The counting unit 180 performs a counting process of counting the number of rising edges or falling edges of the signal Sig_D. The counting unit 180 then outputs a signal CS indicating a count result to the post-processing unit 182 in response to the control signal S1 supplied from the vertical scanning circuit 20. Further, the counting unit 180 performs a reset operation in response to the control signal S2 being supplied from the vertical scanning circuit 20 and transitions to the initial state. Thereby, a count value Count of the counter of the counting unit 180 becomes 0.

The signal CS output from the counting unit 180 is input to the input terminal of the post-processing unit 182. The post-processing unit 182 is a calculation unit that performs a predetermined calculation process in accordance with a count result indicated by the signal CS. The post-processing unit 182 then outputs a process result as the signal DOUT in response to the control signal S3 supplied from the vertical scanning circuit 20. Further, the post-processing unit 182 performs a reset operation in response to the control signal S4 being supplied from the vertical scanning circuit 20 and transitions to the initial state.

The calculation process performed by the post-processing unit 182 is not particularly limited and may be, for example, calculation of a mean value, calculation of a median value, a filtering process, or the like. An example of the filtering process may be, for example, an infinite impulse response (IIR) filter process, a finite impulse response (FIR) filter process, or the like.

For example, the counting unit 180 performs counting on a flame basis, and the post-processing unit 182 can perform a calculation process such as calculation of a mean value, calculation of a median value, a filtering process, or the like on the count result on a flame basis. Alternatively, the counting unit 180 may perform multiple times of counting during one frame, and the post-processing unit 182 may perform a calculation process such as calculation of a mean value, calculation of a median value, a filtering process, or the like on the count result on a counting period basis.

FIG. 4 is a configuration example of the post-processing unit 182 including an IIR filter circuit. As illustrated in FIG. 4, for example, the post-processing unit 182 may be formed of an IIR filter including an adder circuit 184 and a delay circuit 186 and a switch SW. Two input terminals of the adder circuit 184 are connected to the output terminal of the counting unit 180 to which the signal CS is output and the output terminal of the delay circuit 186. The output terminal of the adder circuit 184 is connected to the input terminal of the delay circuit 186 and one terminal of the switch SW. The other terminal of the switch SW is the output terminal of the post-processing unit 182. In the switch SW, the connection state (conduction/non-conduction) is controlled by the control signal S3 supplied from the vertical scanning circuit 20. The post-processing unit 182 outputs the output of the adder circuit 184 as the signal DOUT when the switch SW is in an on-state. By using the IIR filter circuit to form the post-processing unit 182, it is possible to implement a predetermined IIR filter process, for example, a calculation process such as a weighted addition process.

FIG. 5 is a configuration example of the post-processing unit 182 including an FIR filter circuit. As illustrated in FIG. 5, for example, the post-processing unit 182 may be formed of an FIR filter including a plurality of adder circuits 184, a plurality of delay circuits 186, and a plurality of multiplier circuits 188 and the switch SW. The input terminal of the delay circuit 186 on the first stage and the input terminal of the multiplier circuit 188 on the first stage are connected to the output terminal of the counting unit 180 to which the signal CS is output. The input terminal of the delay circuit 186 on the second stage and the input terminal of the multiplier circuit 188 on the second stage are connected to the output terminal of the delay circuit 186 on the first stage. The output terminal of the multiplier circuit 188 on the first stage and the output terminal of the multiplier circuit 188 on the second stage are connected to the two input terminals of the adder circuit 184 on the first stage. The input terminal of the delay circuit 186 on the third stage and the input terminal of the multiplier circuit 188 on the third stage are connected to the output terminal of the delay circuit 186 on the second stage. The output terminal of the adder circuit 184 on the first stage and the output terminal of the multiplier circuit 188 on the third stage are connected to the two input terminals of the adder circuit 184 on the second stage. The input terminal of the multiplier circuit 188 on the fourth stage is connected to the output terminal of the delay circuit 186 on the third stage. The output terminal of the adder circuit 184 on the second stage and the output terminal of the multiplier circuit 188 on the fourth stage are connected to the two input terminals of the adder circuit 184 on the third stage. The output terminal of the adder circuit 184 on the third stage is connected to one terminal of the switch SW. The other terminal of the switch SW is the output terminal of the post-processing unit 182.

In the switch SW, the connection state (conduction/non-conduction) is controlled by the control signal S3 supplied from the vertical scanning circuit 20. The post-processing unit 182 outputs the output of the adder circuit 184 as the signal DOUT when the switch SW is in an on-state. By using the FIR filter circuit to form the post-processing unit 182, it is possible to implement a predetermined FIR filter process, for example, a calculation process such as a moving averaging process.

Since there is a difference in the feature that the IIR filter has a smaller circuit size than the FIR filter and that the FIR filter can realize an ideal filter compared to the IIR filter, a designer may select any of these filters or use these filters in combination in accordance with an application. Note that each of the IIR filter illustrated in FIG. 4 and the FIR filter illustrated in FIG. 5 is a mere example and can be modified as appropriate.

Figure 6:
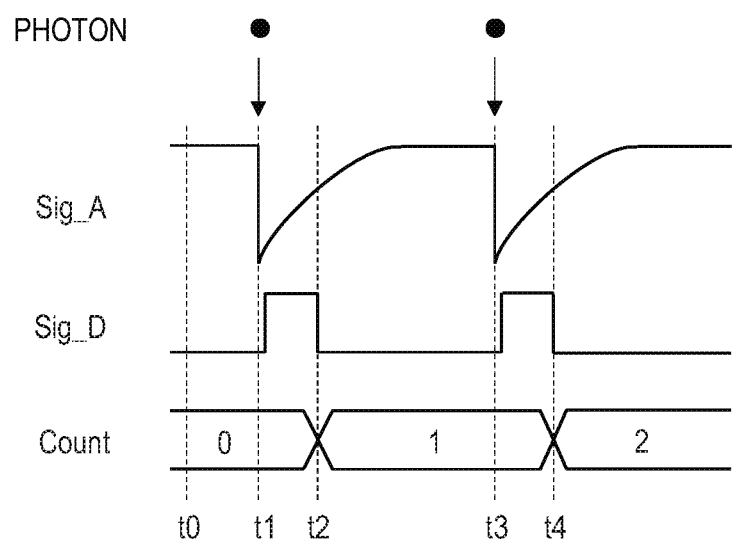
FIG. 6 and FIG. 7 are timing charts illustrating a method of driving the photoelectric conversion device according to the first embodiment of the present invention.
Figure 7:
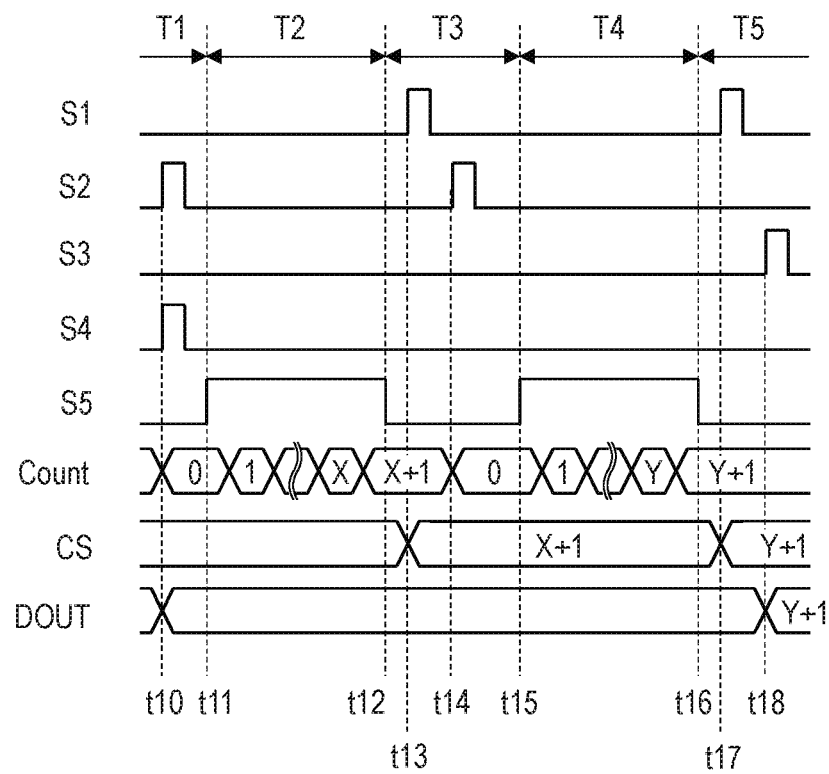

Next, a method of driving the photoelectric conversion device according to the present embodiment will be described with reference to FIG. 6 and FIG. 7. FIG. 6 and FIG. 7 are timing charts illustrating the method of driving the photoelectric conversion device according to the present embodiment.

FIG. 6 is a timing chart illustrating the operation of the photon detection element D, the waveform shaper INV, and the counting unit 180. FIG. 6 illustrates the timings when photons enter the photon detection element D, the signal Sig_A, the signal Sig_D, and the count value of the signal Sig_D (=Count) in the counting unit 180.

At time t0, a photon has not yet entered the photon detection element D, the signal Sig_A is at a predetermined potential indicating a standby state, and the signal Sig_D is at a low level. Further, at the point of time t0, the count value Count of the counting unit 180 is 0.

At time t1, a photon enters the photon detection element D. In response, avalanche multiplication occurs with carriers excited by the incident photon as a seed in the photon detection element D, an avalanche current flows, and thereby the potential of the node N decreases. As the potential of the node N decreases, the potential of the signal Sig_A decreases. Further, in response to a reduction of the potential of the signal Sig_A, the signal Sig_D transitions from the low level to the high level.

On and after time t1, the potential of the signal Sig_A gradually increases as electrons occurring in the photon detection element D are gradually discharged via the quench element Rq. At time t2 when the potential of the signal Sig_A increases to a predetermined value, the signal Sig_D transitions from the high level to the low level and returns to the standby state.

The counter of the counting unit 180 increments the count value Count by 1 in response to rising or falling of the signal Sig_D. In this example, the count value Count increases in response to falling of the signal Sig_D. That is, at time t2, the count value Count of the counter of the counting unit 180 becomes 1.

At time t3 after time t2, a photon enters the photon detection element D again. In response, avalanche multiplication occurs with carriers excited by the incident photon as a seed in the photon detection element D, an avalanche current flows, and thereby the potential of the node N decreases. As the potential of the node N decreases, the potential of the signal Sig_A decreases. Further, in response to a reduction of the potential of the signal Sig_A, the signal Sig_D transitions from the low level to the high level.

On and after time t3, the potential of the signal Sig_A gradually increases as electrons occurring in the photon detection element D are gradually discharged via the quench element Rq. At time t4 when the potential of the signal Sig_A increases to a predetermined value, the signal Sig_D transitions from the high level to the low level and returns to the standby state.

The counter of the counting unit 180 increments the count value Count by 1 in response to falling of the signal Sig_D. That is, at time t4, the count value Count of the counter of the counting unit 180 becomes 2.

FIG. 7 is a timing chart illustrating the operation of the signal processing circuit 18. FIG. 7 illustrates the control signals S1, S2, S3, S4, and S5 of the signal processing circuit 18, the count value Count of the counter of the counting unit 180, the signal CS output from the counting unit 180, and the signal DOUT output from the signal processing circuit 18.

In the initial state, the vertical scanning circuit 20 supplies a Lo-level control signal S5 to the signal processing circuit 18. The counting unit 180 and the post-processing unit 182 that receive the Lo-level control signal S5 are in an inactive state (operation disable). Herein, the next time when the control signal S5 is controlled to the Hi-level is time t11, and a period to time t11 is a period T1.

At time t10 in the period T1, the vertical scanning circuit 20 temporarily controls the control signals S2 and S4 from the Lo-level to the Hi-level. Thereby, the counting unit 180 and the post-processing unit 182 are reset. In response to the reset of the counting unit 180, the count value Count of the counter of the counting unit 180 becomes 0.

Next, the vertical scanning circuit 20 controls the control signal S5 from the Lo-level to the Hi-level at time t11 and holds the Hi-level during a period T2 from time t11 to time t12. Thereby, the counting unit 180 and the post-processing unit 182 that receive the Hi-level control signal S5 during the period T2 enter an active state (operation enable). The period T2 during which the control signal S5 is at the Hi-level is a photon detection period. In the photon detection period, the count value Count of the counter of the counting unit 180 is incremented by 1 every time a photon enters the photon detection element D, as illustrated with reference to FIG. 6. In this example, the count value Count of the counter of the counting unit 180 increases from 0 to X+1 during the period T2.

Next, the vertical scanning circuit 20 controls the control signal S5 from the Hi-level to the Lo-level at time t12 and holds the Lo-level during a period T3 from time t12 to time t15. Thereby, the counting unit 180 and the post-processing unit 182 that receive the Lo-level control signal S5 during the period T3 enter an inactive state, and the photon detection period ends.

At time t13 of the period T3, the vertical scanning circuit 20 temporarily controls the control signal S1 from the Lo-level to the Hi-level. Thereby, the counting unit 180 outputs the count value Count of the counter at that point of time to the post-processing unit 182 as the signal CS. In the example of FIG. 7, the count value Count at time t13 is X+1, the signal CS representing this value is output from the counting unit 180 to the post-processing unit 182.

Further, at time t14 in the period T3, the vertical scanning circuit 20 temporarily controls the control signal S2 from the Lo-level to the Hi-level. Thereby, the counting unit 180 is reset, and the count value Count of the counter of the counting unit 180 returns to 0.

Next, the vertical scanning circuit 20 controls the control signal S5 from the Lo-level to the Hi-level at time t15 and holds the Hi-level during a period T4 from time t15 to time t16. Thereby, the counting unit 180 and the post-processing unit 182 enter an active state, and a photon detection period starts again. In the photon detection period, the count value Count of the counter of the counting unit 180 is incremented by 1 every time a photon enters the photon detection element D, as illustrated with reference to FIG. 6. In this example, the count value Count of the counter of the counting unit 180 increases from 0 to Y+1 during the period T4.

Next, the vertical scanning circuit 20 controls the control signal S5 from the Hi-level to the Lo-level at time t16. Thereby, the counting unit 180 and the post-processing unit 182 that receive the Lo-level control signal S5 during a period T5 on and after time t16 enter an inactive state, and the photon detection period ends.

At time t17 in the period T5, the vertical scanning circuit 20 temporarily controls the control signal S1 from the Lo-level to the Hi-level. Thereby, the counting unit 180 outputs the count value Count of the counter at that point of time to the post-processing unit 182 as the signal CS. In the example of FIG. 7, the count value Count at time t17 is Y+1, the signal CS representing this value is output from the counting unit 180 to the post-processing unit 182.

Further, at time t18 in the period T5, the vertical scanning circuit 20 temporarily controls the control signal S3 from the Lo-level to the Hi-level. Thereby, the post-processing unit 182 outputs the signal DOUT obtained by performing a predetermined process on the signal CS from the counting unit 180.

FIG. 7 illustrates the operation example when two count results (X+1 and Y+1) are processed by the post-processing unit 182. However, the number of signals CS input to the post-processing unit 182 from reset of the post-processing unit 182 to output of the signal DOUT is not particularly limited.

Further, the timing when the counting unit 180 sends out a count result to the post-processing unit 182 may be once during one frame period or may be multiple times during one frame period. When a count result is sent out once during one frame period, the post-processing unit 182 can perform a calculation process for a change of a pixel signal value between frames. When count results are sent out for multiple times during one frame period, the post-processing unit 182 can perform a calculation process for a change of a pixel signal value within one frame.

As described above, according to the present embodiment, not only counting of photon detection signals but also various calculation processes can be performed in the signal processing circuit, and this can realize higher functionality of the photoelectric conversion device.

Second Embodiment

A photoelectric conversion device and a method of driving the same according to a second embodiment of the present invention will be described with reference to FIG. 8 to FIG. 12. The same components as those of the photoelectric conversion device according to the first embodiment are labeled with the same references, and the description thereof will be omitted or simplified.

Figure 8:
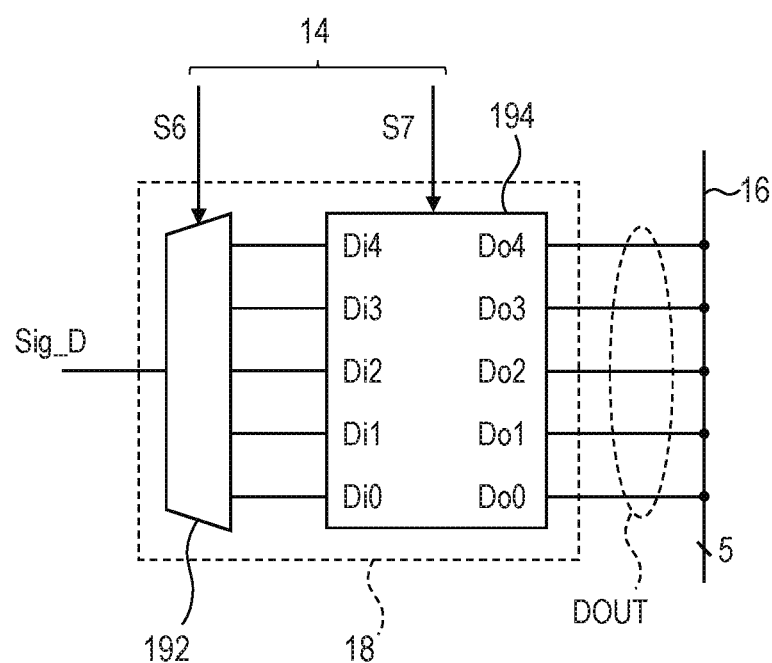
FIG. 8 is a block diagram illustrating a configuration example of a signal processing circuit of a photoelectric conversion device according to a second embodiment of the present invention.

First, the configuration of the photoelectric conversion device according to the present embodiment will be described with reference to FIG. 8. FIG. 8 is a block diagram illustrating a configuration example of a signal processing circuit of the photoelectric conversion device according to the present embodiment.

The photoelectric conversion device according to the present embodiment is the same as the photoelectric conversion device according to the first embodiment except for a difference in the configuration of the signal processing circuit 18. That is, as illustrated in FIG. 8, the signal processing circuit 18 of the photoelectric conversion device according to the present embodiment includes a pre-processing unit 192 and a counting unit 194. The pre-processing unit 192 has one input terminal and a plurality of output terminals. The counting unit 194 has a plurality of input terminals Di0 to Di4 to which values of respective bits of a digital signal are input and a plurality of output terminals Do0 to Do4 from which values of respective bits of a digital signal are output.

The input terminal of the pre-processing unit 192 that is also the input terminal of the signal processing circuit 18 is connected to the output terminal of the waveform shaper INV. The plurality of output terminals of the pre-processing unit 192 are connected to the input terminals Di0 to Di4 of the counting unit 194. The output terminals Do0 to Do4 of the counting unit 194 that are also the output terminals of the signal processing circuit 18 are connected to the data line 16. The pre-processing unit 192 and the counting unit 194 are connected to the control line 14. A control signal S6 used for selecting an output terminal to output the signal Sig_D is supplied to the pre-processing unit 192 from the vertical scanning circuit 20 via the control line 14. A control signal S7 used for controlling the output of a count result is supplied to the counting unit 194 from the vertical scanning circuit 20 via the control line 14. Note that, although not illustrated in FIG. 8, a control signal used for controlling the reset operation of the pre-processing unit 192 and the counting unit 194 or a control signal used for switching enable/disable of operation may be further input in the same manner as the signal processing circuit 18 of the first embodiment.

The pre-processing unit 192 is a selector that selects an output terminal of the plurality of output terminals that is used to output the one-bit signal Sig_D that is an input signal in accordance with the control signal S6 supplied from the vertical scanning circuit 20. For example, when the counting unit 194 is formed of an adder for a five-bit digital signal as illustrated in FIG. 8, the pre-processing unit 192 has at least five output terminals. These five output terminals correspond to the input terminals Di0 to Di4 of the counting unit 194.

The counting unit 194 adds the five-bit input signals input from the input terminals Di0 to Di4 and outputs a count result (signal DOUT) from the output terminals Do0 to Do4.

The output of the signal DOUT from the counting unit 194 is controlled by the control signal S7 supplied from the vertical scanning circuit 20. Note that, in FIG. 8, the input terminal Di0 and the output terminal Do0 correspond to the least significant bit (the 0th bit), and the input terminal Di4 and the output terminal Do4 correspond to the most significant bit (the fourth bit). Although an example in which the number of bits of a digital signal handled by the counting unit 194 is five is illustrated here, the number of bits of a digital signal handled by the counting unit 194 is not particularly limited.

The signal processing circuit 18 performs a weighted addition process on the one-bit signal Sig_D. Specifically, the pre-processing unit 192 performs weighting on the signal Sig_D, and the counting unit 194 cumulatively adds the weighted results output from the pre-processing unit 192.

That is, the pre-processing unit 192 selects an input terminal of the input terminals Di0 to Di4 of the counting unit 194 that is used to input the signal Sig_D in accordance with the control signal S6 supplied from the vertical scanning circuit 20. For example, when the pre-processing unit 192 selects the input terminal Di0 corresponding to the 0th bit of the digital signal input to the counting unit 194, the signal Sig_D weighted by one-fold is input to the counting unit 194. Further, when the pre-processing unit 192 selects the input terminal Di1 corresponding to the first bit of the digital signal input to the counting unit 194, the signal Sig_D weighted by two-fold is input to the counting unit 194. When the pre-processing unit 192 selects the input terminal Di3 corresponding to the third bit of the digital signal input to the counting unit 194, the signal Sig_D weighted by eight-fold is input to the counting unit 194. That is, the pre-processing unit 192 functions as a calculation unit that performs weighted calculation on the signal Sig_D and outputs a calculation result to the counting unit 194. The counting unit 194 is a cumulative adder for multibit input. The counting unit 194 adds the five-bit signal input from the pre-processing unit 192 as described above and outputs a count result from the output terminals Do0 to Do4 as the five-bit signal DOUT.

Figure 9:
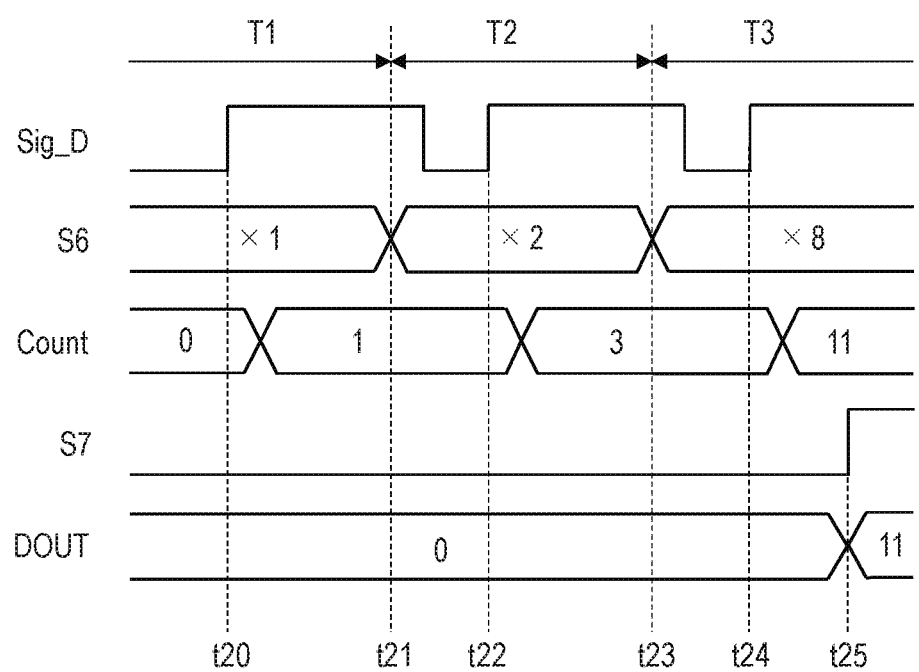
FIG. 9 is a timing chart illustrating a method of driving the photoelectric conversion device according to the second embodiment of the present invention.

Next, the method of driving the photoelectric conversion device according to the present embodiment will be described with reference to FIG. 8 and FIG. 9. FIG. 9 is a timing chart illustrating the operation of the signal processing circuit 18. FIG. 9 illustrates the signal Sig_D, the control signals S6 and S7 of the signal processing circuit 18, the count value Count of the counting unit 180, and the signal DOUT output from the signal processing circuit 18.

The weighting performed by the pre-processing unit 192 can be dynamically changed by controlling the control signal S6 supplied from the vertical scanning circuit 20. For example, in FIG. 9, in the period T1 to time t21, one-fold weighting is applied to the signal Sig_D, and every time a photon enters the photon detection element D during the period T1, the count value Count of the counting unit 194 is incremented by 1. In the period T2 from time t21 to time t23, two-fold weighting is applied to the signal Sig_D, and every time a photon enters the photon detection element D during the period T2, the count value Count of the counting unit 194 is incremented by 2. In the period T3 from time t23, eight-fold weighting is applied to the signal Sig_D, and every time a photon enters the photon detection element D during the period T3, the count value Count of the counting unit 194 is incremented by 8.

In the initial state, the count value Count of the counting unit 194 is 0, and the vertical scanning circuit 20 supplies the Lo-level control signal S7 to the counting unit 194.

At time t20 in the period T1, a photon enters the photon detection element D, and the signal Sig_D transitions from the Lo-level to the Hi-level. The weighting in the pre-processing unit 192 is one-fold during the period T1, and the pre-processing unit 192 inputs the signal Sig_D to the input terminal Di0 corresponding to the 0th bit of the counting unit 194. That is, a digital signal input to the counting unit 194 is 00001. Accordingly, the count value Count of the counting unit 194 becomes 1.

Next, at time t22 in the period T2, a photon enters the photon detection element D, and the signal Sig_D transitions from the Lo-level to the Hi-level. The weighting in the pre-processing unit 192 is two-fold during the period T2, and the pre-processing unit 192 inputs the signal Sig_D to the input terminal Di1 corresponding to the first bit of the counting unit 194. That is, a digital signal input to the counting unit 194 is 00010. Accordingly, the count value Count of the counting unit 194 becomes 3 that is 1 pulse 2.

Next, at time t24 in the period T3, a photon enters the photon detection element D, and the signal Sig_D transitions from the Lo-level to the Hi-level. The weighting in the pre-processing unit 192 is eight-fold during the period T3, and the pre-processing unit 192 inputs the signal Sig_D to the input terminal Di3 corresponding to the third bit of the counting unit 194. That is, a digital signal input to the counting unit 194 is 01000. Accordingly, the count value Count of the counting unit 194 becomes 11 that is 3 pulse 8.

Next, the vertical scanning circuit 20 controls the control signal S7 from the Lo-level to the Hi-level at time t25. Thereby, the counting unit 194 outputs the count value Count at this time from the output terminals Do0 to Do4 as the signal DOUT.

Note that, although the present embodiment is configured such that the counting unit 194 is a multibit-input cumulative adder and the pre-processing unit 192 selects a bit number of the counting unit 194 to which the signal Sig_D is input, the configuration example of the weighted adder circuit is not limited thereto.

Further, although the circuit to perform weighted addition is illustrated as the signal processing circuit 18 in FIG. 8, a calculation process performed by the signal processing circuit 18 is not limited thereto. For example, the filter circuit illustrated in FIG. 4 or FIG. 5 may be provided in the pre-processing unit 192. When the pre-processing unit 192 is a low-pass filter formed of an IIR filter, for example, the signal Sig_D is less likely to pass through the pre-processing unit 192 when the amount of light entering the photon detection element D is larger, that is, the cycle of the signal Sig_D is shorter. That is, even when a light amount exceeding the upper limit value that can be counted by the counting unit 194 enters the photon detection element D, counting in the counting unit 194 can be performed.

Figure 10:
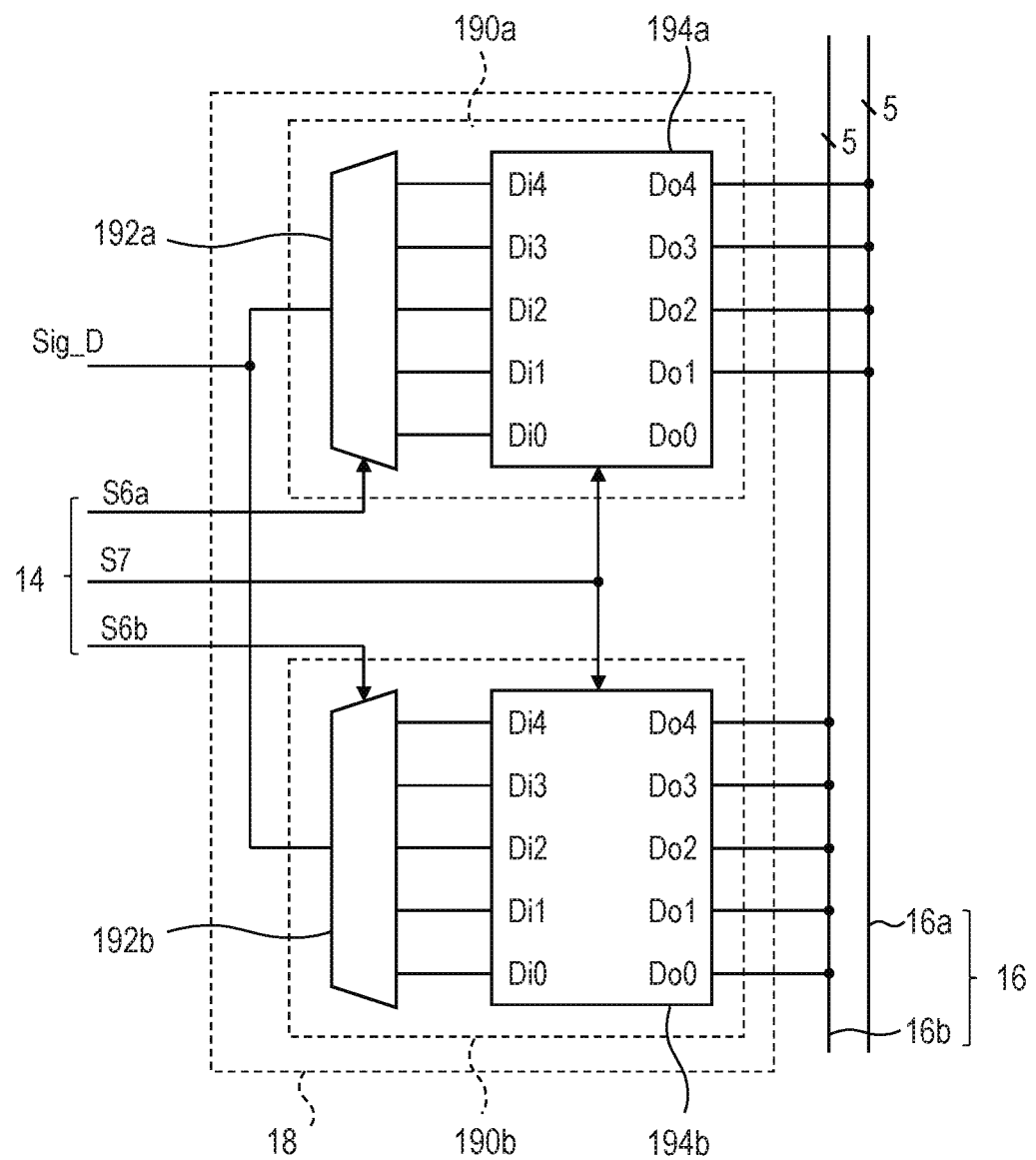
FIG. 10 is a block diagram illustrating another configuration example of a signal processing circuit of the photoelectric conversion device according to the second embodiment of the present invention.

Further, the signal processing circuit 18 may include a plurality of pre-processing units 192 and a plurality of counting units 194. FIG. 10 illustrates an example in which the signal processing circuit 18 is formed of a signal processing unit 190a including a pre-processing unit 192a and a counting unit 194a and a signal processing unit 190b including a pre-processing unit 192b and a counting unit 194b.

The signal Sig_D is input in parallel to both the signal processing unit 190a and the signal processing unit 190b. A control signal S6a used for selecting an output terminal that is used to output the signal Sig_D is supplied to the pre-processing unit 192a from the vertical scanning circuit 20 via the control line 14. A control signal S6b used for selecting an output terminal that is used to output the signal Sig_D is supplied to the pre-processing unit 192b from the vertical scanning circuit 20 via the control line 14. The control signal S7 used for controlling output of a count result is supplied to the counting units 194a and 194b from the vertical scanning circuit 20 via the control line 14. The counting units 194a and 194b output the signals DOUT to data lines 16a and 16b, respectively, in accordance with the control signal S7.

The control signals S6a and S6b may perform different control on the pre-processing units 192a and 192b. For example, when both the signal processing unit 190a and the signal processing unit 190b are weighted adder circuits, the signal processing unit 190a and the signal processing unit 190b can be configured to perform different weighting processes on the signal Sig_D.

Note that, when all the pixels 12 forming the pixel region 10 are controlled simultaneously by the control signals S6 and S7, the signal Sig_D is input to the signal processing circuit 18 asynchronously on a pixel 12 basis. Accordingly, the pixel 12 may be configured as illustrated in FIG. 11 or FIG. 12, for example, and a synchronization process may be performed.

Figure 11:
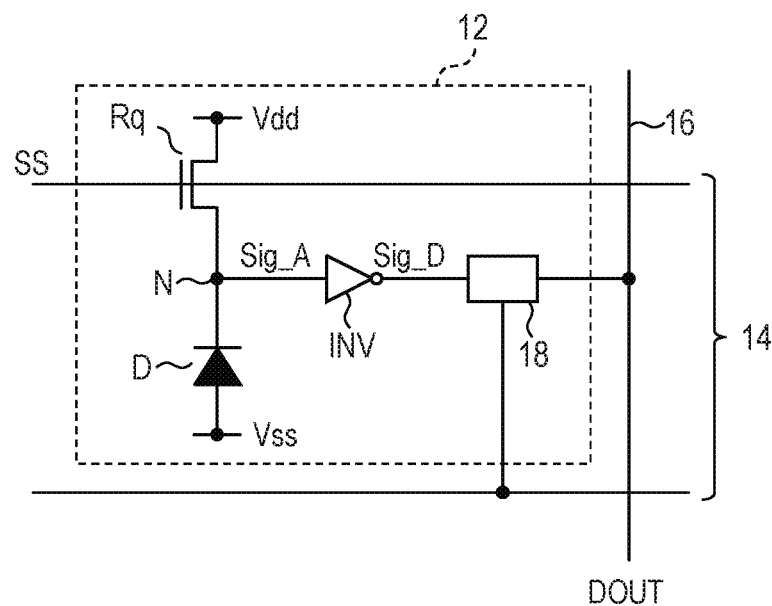
FIG. 11 and FIG. 12 are circuit diagrams illustrating other configuration examples of a pixel of the photoelectric conversion device according to the second embodiment of the present invention.

The pixel 12 illustrated in FIG. 11 is a configuration example for inputting a synchronous signal SS to the quench element Rq and controlling the photon detection element D to detect a photon only once in one cycle of the synchronous signal SS. When the quench element Rq is formed of a P-type MOS transistor, for example, such control can be performed. The pixel 12 illustrated in FIG. 12 is a configuration example for inputting the signal Sig_D to the signal processing circuit 18 via a synchronization circuit 22. The synchronization circuit 22 is controlled to input the signal Sig_D to the signal processing circuit 18 only once in one cycle of the synchronous signal SS.

The synchronous signal SS can be supplied from the control circuit 50, for example. In such a case, the control circuit 50 functions as a control unit that controls a calculation process in the signal processing circuit 18 to be performed in synchronization with the synchronous signal SS.

Figure 12:
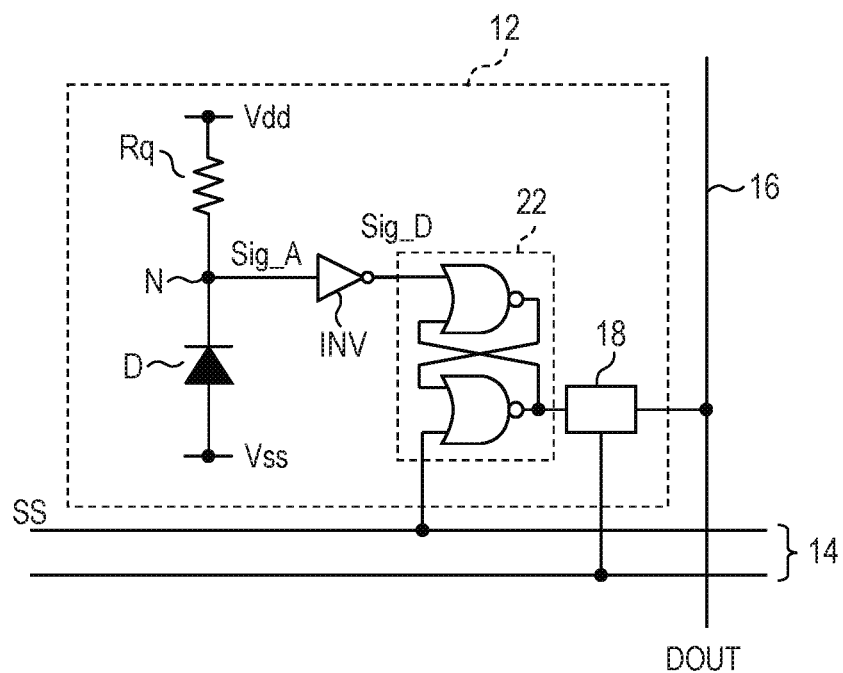

Note that, although the synchronization circuit 22 is formed of an SR latch circuit in the pixel 12 illustrated in FIG. 12, the configuration of the synchronization circuit 22 is not limited thereto. Further, with respect to synchronization of the signal Sig_D, FIG. 11 or FIG. 12 illustrates an example, and synchronization of the signal Sig_D is not limited thereto.

As described above, according to the present embodiment, not only counting of photon detection signals but also various calculation processes can be performed in the signal processing circuit, and this can realize higher functionality of the photoelectric conversion device.

Third Embodiment

Figure 13:
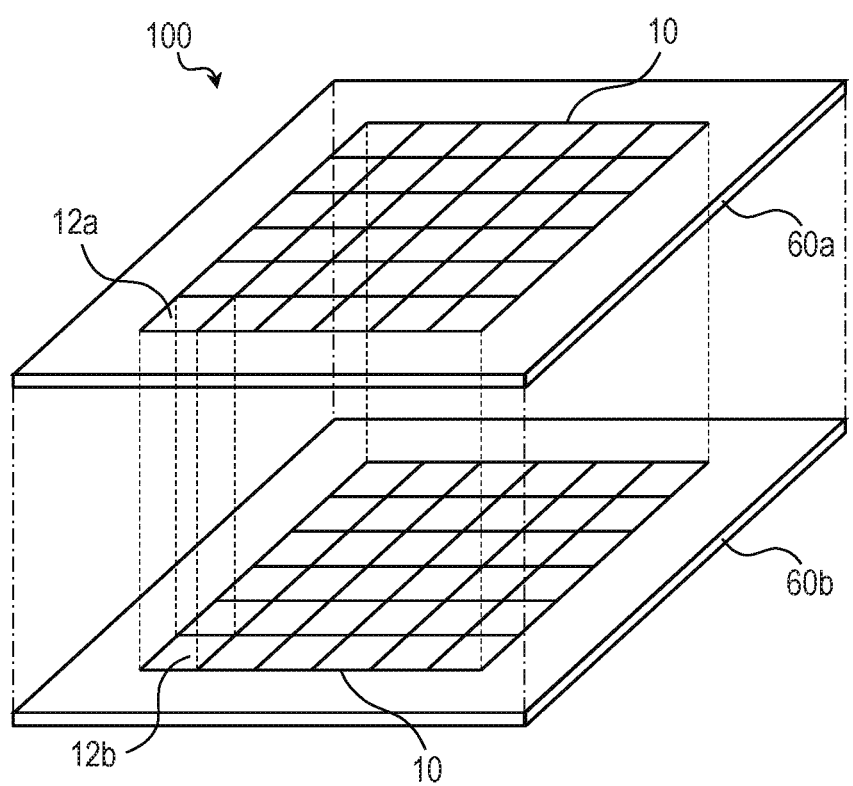
FIG. 13 is a schematic diagram illustrating a configuration example of a photoelectric conversion device according to a third embodiment of the present invention.

A photoelectric conversion device according to a third embodiment of the present invention will be described with reference to FIG. 13. The same components as those of the photoelectric conversion device according to the first and second embodiments are labeled with the same references, and the description thereof will be omitted or simplified. FIG. 13 is a schematic diagram illustrating a configuration example of the photoelectric conversion device according to the present embodiment.

As illustrated in FIG. 13, the photoelectric conversion device 100 according to the present embodiment can be configured such that respective blocks illustrated in FIG. 1 are divided into two substrates 60a and 60b and these substrates 60a and 60b are joined to each other. The substrate 60a and the substrate 60b may be electrically connected to each other via conductive members such as bump electrodes, through electrodes, or the like, for example.

Each of the plurality of pixels 12 arranged in the pixel region 10 includes a pixel portion 12a provided on the substrate 60a and a pixel portion 12b provided in the substrate 60b. At least the photon detection element D out of the components of the pixel 12 is arranged in the pixel portion 12a provided on the substrate 60a. Further, at least the signal processing circuit 18 out of the components of the pixel 12 is arranged in the pixel portion 12b provided on the substrate 60b.

Other components of the pixel 12, that is, the quench element Rq and the waveform shaper INV may be arranged on any of the pixel portion 12a and the pixel portion 12b. However, when the quench element Rq and the waveform shaper INV are arranged on the pixel portion 12b side, it is possible to maximize the area for the photon detection element D, that is, maximize sensitivity and, in addition, it is possible to achieve process design dedicated for characteristics of the photon detection element D, and it is therefore preferable to arrange the quench element Rq and the waveform shaper INV on the pixel portion 12b side.

Further, although not illustrated in FIG. 13, each of other elements forming the photoelectric conversion device 100, that is, the vertical scanning circuit 20, the horizontal scanning circuit 30, the output circuit 40, and the control circuit 50 may be arranged on either the substrate 60a or the substrate 60b. In such a case, it is more preferable to arrange the vertical scanning circuit 20, the horizontal scanning circuit 30, the output circuit 40, and the control circuit 50 on the substrate 60b side as well for the same reason as the reason why the quench element Rq and the waveform shaper INV are arranged on the pixel portion 12b side.

As described above, in the present embodiment, the two substrates 60a and 60b are stacked to form the photoelectric conversion device, at least the photon detection element D out of the components of each pixel 12 is arranged on the substrate 60a, and at least the signal processing circuit 18 out of the components of each pixel 12 is arranged on the substrate 60b. Therefore, according to the present embodiment, the sensitivity or the degree of integration of the pixel 12 can be improved compared to a case where a stack-type photoelectric conversion device is not configured, and this can realize much higher performance and higher functionality of the photoelectric conversion device.

Fourth Embodiment

An imaging system according to a fourth embodiment of the present invention will be described with reference to FIG. 14. FIG. 14 is a block diagram illustrating a general configuration of the imaging system according to the present embodiment.

The photoelectric conversion device 100 described in the first to third embodiments described above can be applied to various imaging systems. Examples of applicable imaging systems may include a digital still camera, a digital camcorder, a surveillance camera, a copying machine, a fax machine, a mobile phone, an on-vehicle camera, an observation satellite, and the like. In addition, a camera module including an optical system such as a lens and an imaging device is also included in the imaging system. FIG. 14 illustrates a block diagram of a digital still camera as an example out of these examples.

An imaging system 200 illustrated as an example in FIG. 14 includes an imaging device 201, a lens 202 that captures an optical image of a subject onto the imaging device 201, an aperture 204 for changing a light amount passing through the lens 202, and a barrier 206 for protecting the lens 202. The lens 202 and the aperture 204 form an optical system that converges a light onto the imaging device 201. The imaging device 201 is the photoelectric conversion device 100 described in any of the first to third embodiments and converts an optical image captured by the lens 202 into image data.

Further, the imaging system 200 includes a signal processing unit 208 that processes an output signal output from the imaging device 201. The signal processing unit 208 generates image data from digital signals output by the imaging device 201. Further, the signal processing unit 208 performs operations of performing various correction or compression to output image data, if necessary. The signal processing unit 208 may be formed on the same semiconductor substrate as the imaging device 201.

Furthermore, the imaging system 200 includes a memory unit 210 for temporarily storing image data therein and an external interface unit (external I/F unit) 212 for communicating with an external computer or the like. The imaging system 200 further includes a storage medium 214 such as a semiconductor memory for performing storage or readout of imaging data and a storage medium control interface unit (storage medium control I/F unit) 216 for performing storage or readout on the storage medium 214. Note that the storage medium 214 may be embedded in the imaging system 200 or may be removable.

Furthermore, the imaging system 200 includes a general control/operation unit 218 that performs various calculation and controls the entire digital still camera and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes an output signal output from the imaging device 201.

The imaging device 201 outputs an imaging signal to the signal processing unit 208. The signal processing unit 208 performs predetermined signal processing on an imaging signal output from the imaging device 201 and outputs image data. The signal processing unit 208 uses an imaging signal to generate an image.

As described above, according to the present embodiment, the imaging system to which the photoelectric conversion device 100 according to any of the first to third embodiments is applied can be realized.

Fifth Embodiment

Figure 15A:
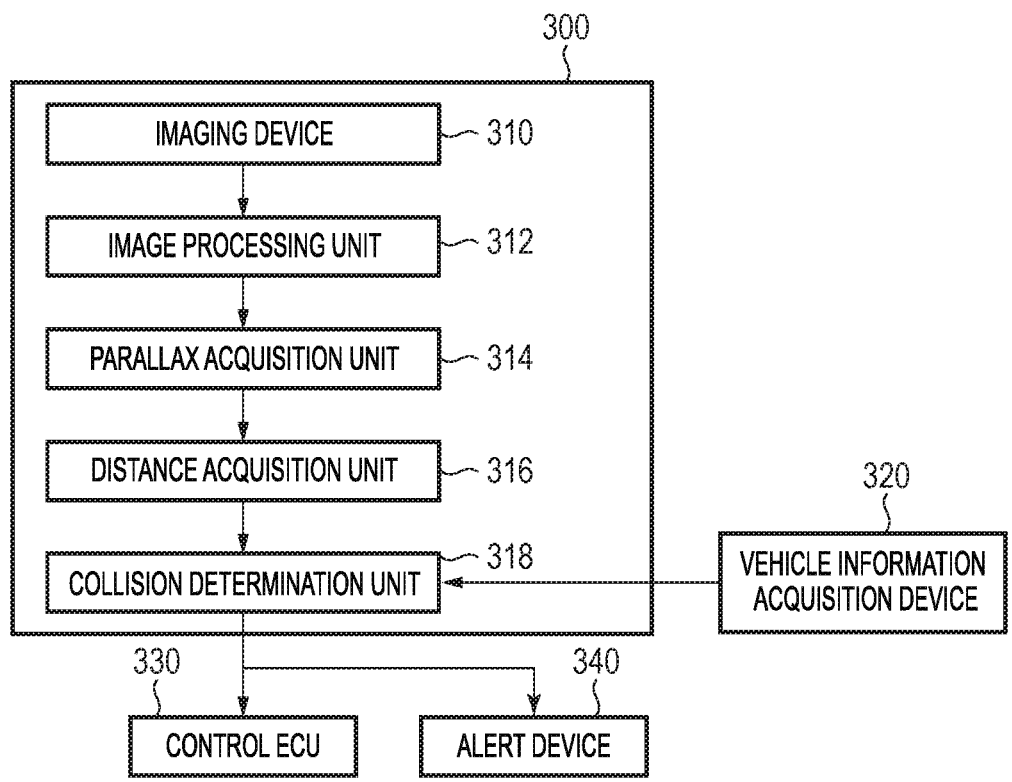
FIG. 15A is a diagram illustrating a configuration example of an imaging system according to a fifth embodiment of the present invention.
Figure 15B:
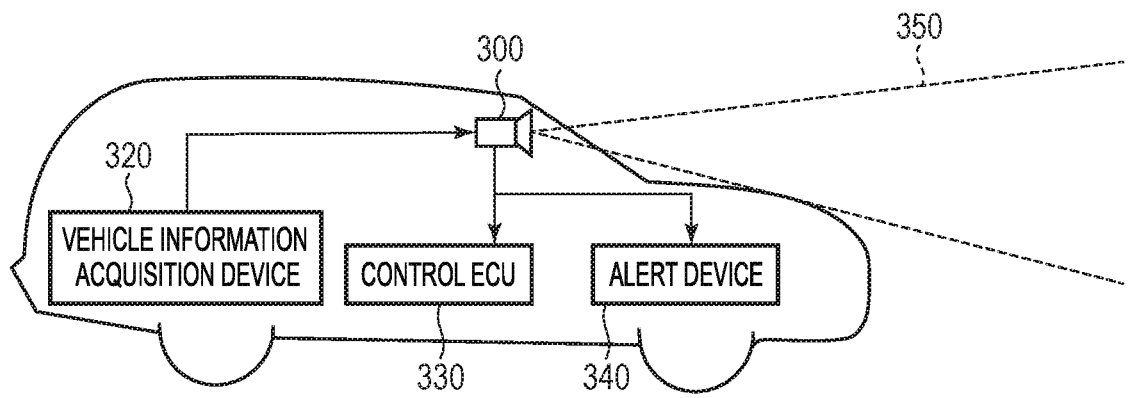
FIG. 15B is a diagram illustrating a configuration example of a movable object according to the fifth embodiment of the present invention.

An imaging system and a movable object according to a fifth embodiment of the present invention will be described with reference to FIG. 15A and FIG. 15B. FIG. 15A is a diagram illustrating a configuration of the imaging system according to the present embodiment. FIG. 15B is a diagram illustrating a configuration of the movable object according to the present embodiment.

FIG. 15A illustrates an example of an imaging system related to an on-vehicle camera. An imaging system 300 includes an imaging device 310. The imaging device 310 is the photoelectric conversion device 100 described in any of the above first to third embodiments. The imaging system 300 includes an image processing unit 312 that performs image processing on a plurality of image data acquired by the imaging device 310 and a parallax acquisition unit 314 that calculates a parallax (a phase difference of parallax images) from the plurality of image data acquired by the imaging system 300. Further, the imaging system 300 includes a distance acquisition unit 316 that calculates a distance to the object based on the calculated parallax and a collision determination unit 318 that determines whether or not there is a collision possibility based on the calculated distance. Here, the parallax acquisition unit 314 and the distance acquisition unit 316 are an example of a distance information acquisition unit that acquires distance information on the distance to the object. That is, the distance information is information on a parallax, a defocus amount, a distance to an object, or the like. The collision determination unit 318 may use any of the distance information to determine the collision possibility. The distance information acquisition unit may be implemented by dedicatedly designed hardware or may be implemented by a software module. Further, the distance information acquisition unit may be implemented by a field programmable gate array (FPGA), an application specific integrated circuit (ASIC), or the like or may be implemented by a combination thereof.

The imaging system 300 is connected to the vehicle information acquisition device 320 and can acquire vehicle information such as a vehicle speed, a yaw rate, a steering angle, or the like. Further, the imaging system 300 is connected to a control ECU 330, which is a control device that outputs a control signal for causing a vehicle to generate braking force based on a determination result by the collision determination unit 318. Further, the imaging system 300 is also connected to an alert device 340 that issues an alert to the driver based on a determination result by the collision determination unit 318. For example, when the collision probability is high as the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 300. FIG. 15B illustrates the imaging system 300 when a front area of a vehicle (a capturing area 350) is captured. The vehicle information acquisition device 320 transmits an instruction to the imaging system 300 or the imaging device 310. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiments

The present invention is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is also one of the embodiments of the present invention.

Further, although the photoelectric conversion device in which the pixels 12 are arranged two-dimensionally within the pixel region 10 is assumed in the above embodiments, the arrangement of the pixels 12 is not limited to two-dimensional arrangement. For example, the photoelectric conversion device may be formed of a single pixel 12, or the pixels 12 may be arranged one-dimensionally or three-dimensionally.

Further, although the control line 14 is a signal line common to all the pixels 12 on each row and the data line 16 is a signal line common to all the pixels 12 on each column in the above embodiments, the arrangement of the control line 14 and the data line 16 is not limited thereto. For example, the control line 14 or the data line 16 common to each block may be arranged where one unit includes i rows by j columns (both i and j are natural integers).

Further, the imaging systems illustrated in the above fourth and fifth embodiments are examples of an imaging system to which the photoelectric conversion device of the present invention may be applied, and an imaging system to which the photoelectric conversion device of the present invention can be applied is not limited to the configuration illustrated in FIG. 14 and FIG. 15A.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-163864, filed Sep. 9, 2019, which is hereby incorporated by reference herein in its entirety.

What is claimed is:

1. A photoelectric conversion device comprising a plurality of pixels arranged in an array to form a plurality of rows and a plurality of columns,
    wherein each of the plurality of pixels includes:
    a photon detection element that outputs an output signal generated by avalanche multiplication in accordance with incidence of a photon;
    a quench element connected to the photon detection element;
    a waveform shaper that is connected to the photon detection element and generates a detection signal based on the output signal; and
    a signal processing circuit that performs signal processing on the detection signal output from the waveform shaper, and
    wherein the signal processing circuit of each of the plurality of pixels includes:
    a counting unit that performs a counting process of counting the detection signal output from the waveform shaper of a corresponding pixel; and
    a calculation unit that performs a predetermined calculation process on a count result output from the counting unit.

2. The photoelectric conversion device according to claim 1, wherein the calculation unit performs a filter process on the count result output from the counting unit.

3. The photoelectric conversion device according to claim 2, wherein the filter process is an IIR filter process.

4. The photoelectric conversion device according to claim 2, wherein the filter process is an FIR filter process.

5. The photoelectric conversion device according to claim 1,
    wherein the counting unit performs counting on a frame basis, and
    wherein the calculation unit performs the calculation processing on the count result obtained on a frame basis.

6. The photoelectric conversion device according to claim 1,
    wherein the counting unit performs counting on a frame basis, and
    wherein the calculation unit outputs a mean value or a median value of the count result obtained in a plurality of frames.

7. The photoelectric conversion device according to claim 1 further comprising:
    a first substrate on which the photon detection element of each of the plurality of pixels is arranged; and
    a second substrate which is stacked on the first substrate and on which the signal processing circuit of each of the plurality of pixels is arranged.

8. An imaging system comprising:
    the photoelectric conversion device according to claim 1; and
    a signal processing device that processes a signal output from the photoelectric conversion device.

9. A movable object comprising:
    the photoelectric conversion device according to claim 1;
    a distance information acquisition unit that acquires distance information on a distance to an object, from a parallax image based on signals from the photoelectric conversion device; and
    a controlling unit that controls the movable object based on the distance information.

10. A photoelectric conversion device comprising a plurality of pixels arranged in an array to form a plurality of rows and a plurality of columns,
- wherein each of the plurality of pixels includes:
  - a photon detection element that outputs an output signal generated by avalanche multiplication in accordance with incidence of a photon;
  - a quench element connected to the photon detection element;
  - a waveform shaper that is connected to the photon detection element and generates a detection signal based on the output signal; and
  - a signal processing circuit that performs signal processing on the detection signal output from the waveform shaper, and
- wherein the signal processing circuit of each of the plurality of pixels includes:
  - a calculation unit that performs a predetermined calculation process on the detection signal output from the waveform shaper of a corresponding pixel; and
  - a counting unit that performs a counting process on a calculation result output from the calculation unit.

11. The photoelectric conversion device according to claim 10, wherein the calculation unit performs weighted calculation on the detection signal output from the waveform shaper.

12. The photoelectric conversion device according to claim 10, wherein the calculation unit performs a filter process on the detection signal output from the waveform shaper.

13. The photoelectric conversion device according to claim 12, wherein the filter process is an IIR filter process.

14. The photoelectric conversion device according to claim 12, wherein the filter process is an FIR filter process.

15. The photoelectric conversion device according to claim 10, wherein the signal processing circuit includes a plurality of signal processing units each including the calculation unit and the counting unit.

16. The photoelectric conversion device according to claim 15,
- wherein the plurality of signal processing units includes a first signal processing unit and a second signal processing unit, and
- wherein a calculation process performed by the calculation unit of the first signal processing unit differs from a calculation process performed by the calculation unit of the second signal processing unit.

17. The photoelectric conversion device according to claim 10 further comprising a control unit that controls the calculation process in the signal processing circuit to be performed in synchronization with a synchronous signal.

18. The photoelectric conversion device according to claim 10 further comprising:
- a first substrate on which the photon detection element of each of the plurality of pixels is arranged; and
- a second substrate which is stacked on the first substrate and on which the signal processing circuit of each of the plurality of pixels is arranged.

19. An imaging system comprising:
- the photoelectric conversion device according to claim 10; and
- a signal processing device that processes a signal output from the photoelectric conversion device.

20. A movable object comprising:
- the photoelectric conversion device according to claim 10;
- a distance information acquisition unit that acquires distance information on a distance to an object, from a parallax image based on signals from the photoelectric conversion device; and
- a controlling unit that controls the movable object based on the distance information.

* * * * *